US010679044B2

(12) United States Patent
Vaezi Joze et al.

(10) Patent No.: US 10,679,044 B2
(45) Date of Patent: Jun. 9, 2020

(54) HUMAN ACTION DATA SET GENERATION IN A MACHINE LEARNING SYSTEM

(71) Applicant: Microsoft Technology Licensing, LLC, Redmond, WA (US)

(72) Inventors: Hamidreza Vaezi Joze, Redmond, WA (US); Ilya Zharkov, Sammamish, WA (US); Vivek Pradeep, Redmond, WA (US); Mehran Khodabandeh, Coquitlam (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 15/934,315

(22) Filed: Mar. 23, 2018

(65) Prior Publication Data

US 2019/0294871 A1 Sep. 26, 2019

(51) Int. Cl.
*G06K 9/00* (2006.01)
*G06T 7/246* (2017.01)
*G06N 20/00* (2019.01)

(52) U.S. Cl.
CPC ..... *G06K 9/00342* (2013.01); *G06K 9/00369* (2013.01); *G06N 20/00* (2019.01); *G06T 7/248* (2017.01); *G06T 2207/20044* (2013.01)

(58) Field of Classification Search
None
See application file for complete search history.

(56) References Cited

U.S. PATENT DOCUMENTS

| | | | |
|---|---|---|---|
| 9,014,420 B2 | 4/2015 | Liu et al. | |
| 10,296,102 B1* | 5/2019 | Misra | G06F 3/017 |
| 2013/0202210 A1 | 8/2013 | Ryoo et al. | |
| 2019/0116322 A1* | 4/2019 | Holzer | G06T 7/11 |
| 2019/0197368 A1* | 6/2019 | Madani | G06K 9/66 |

FOREIGN PATENT DOCUMENTS

WO 2017158363 A1 9/2017

OTHER PUBLICATIONS

Amersfoort, et al., "Transformation-based models of video sequences", In Journal of Computing Research Repository, Jan. 2017, pp. 1-11.
(Continued)

*Primary Examiner* — Leon Viet Q Nguyen
(74) *Attorney, Agent, or Firm* — Arent Fox LLP

(57) ABSTRACT

Methods, apparatuses, and computer-readable mediums for generating human action data sets are disclosed by the present disclosure. In an aspect, an apparatus may receive a set of reference images, where each of the images within the set of reference images includes a person, and a background image. The apparatus may identify body parts of the person from the set of reference image and generate a transformed skeleton image by mapping each of the body parts of the person to corresponding skeleton parts of a target skeleton. The apparatus may generate a mask of the transformed skeleton image. The apparatus may generate, using machine learning, a frame of the person formed according to the target skeleton within the background image.

20 Claims, 10 Drawing Sheets

(56) References Cited

OTHER PUBLICATIONS

Arjovsky, et al., "Wasserstein GAN", In Journal of Computing Research Repository, Jan. 2017, pp. 1-29.
Bagheri, et al., "Keep it accurate and diverse: Enhancing action recognition performance by ensemble learning", In Proceedings of IEEE Conference on Computer Vision and Pattern Recognition Workshops, Jun. 7, 2015, pp. 22-29.
Bayer, et al., "A multi modal approach to gesture recognition from audio and video data", In Proceedings of the 15th ACM on International conference on multimodal interaction, Dec. 9, 2013, pp. 461-465.
Cao, et al., "Realtime multiperson 2d pose estimation using part affinity fields", In Proceedings of IEEE Conference on Computer Vision and Pattern Recognition, Jul. 21, 2017, 9 Pages.
Carreira, et al., "Quo Vadis, Action Recognition? A New Model and the Kinetics Dataset", In Journal of Computing Research Repository, May 2017, 10 Pages.
Deng, et al., "ImageNet: A large-scale hierarchical image database", In Journal of Computer Vision and Pattern Recognition, Jun. 20, 2009, pp. 1-8.
Denton, et al., "Deep generative image models using a laplacian pyramid of adversarial networks", In Journal of Advances in Neural Information Processing Systems, Dec. 7, 2015, pp. 1-10.
Donahue, et al., "Long-term recurrent convolutional networks for visual recognition and description", In Proceedings of IEEE conference on computer vision and pattern recognition, Jun. 7, 2015, pp. 2625-2634.
Doretto, et al., "Dynamic textures", In International Journal of Computer Vision, vol. 51, Issue 2, Feb. 1 2003, pp. 1-38.
Feichtenhofer, et al., "Convolutional two-stream network fusion for video action recognition", In Proceedings of IEEE Conference on Computer Vision and Pattern Recognition, Jun. 27, 2016, pp. 1933-1941.
Finn, et al., "Unsupervised learning for physical interaction through video prediction", In Journal of Advances in Neural Information Processing Systems, Dec. 5, 2016, pp. 1-9.
Goodfellow, et al., "Generative adversarial nets", In Journal of Advances in neural information processing systems, Dec. 8, 2014, pp. 1-9.
Huang, et al., "Densely connected convolutional networks", In Proceedings of the IEEE Conference on Computer Vision and Pattern Recognition, Jul. 21, 2017, 9 Pages.
Ioffe, et al., "Batch normalization: accelerating deep network training by reducing internal covariate shift", In Proceedings of the 32nd International Conference on International Conference on Machine Learning, Jul. 6, 2015, pp. 1-11.
Isola, et al., "Image-to-image translation with conditional adversarial networks", In Journal of the Computing Research Repository, Nov. 2016, 17 Pages.
Ji, et al., "3D convolutional neural networks for human action recognition", In Journal of IEEE Transactions on Pattern Analysis and Machine Intelligence, vol. 35, Issue 1, Jan. 2013, pp. 1-14.
Junejo, et al., "View-independent action recognition from temporal self-similarities", In Journal of IEEE Transactions on Pattern Analysis and Machine Intelligence, vol. 33, Issue 1, Jan. 2011, pp. 1-13.
Kaaniche, Mohamed, "Gesture recognition from video sequences", In Doctoral dissertation of Université Nice Sophia Antipolis, Oct. 2009, 130 Pages.
Kalchbrenner, et al., "Video pixel networks", In Journal of Computing Research Repository, Oct. 2016, pp. 1-16.
Karpathy, et al., "Large-Scale Video Classification with Convolutional Neural Networks", In IEEE Conference on Computer Vision and Pattern Recognition, Jun. 2014, pp. 1725-1732.
Karras, et al., "Progressive growing of GANs for improved quality, stability, and variation", In Journal of Computing Research Repository, Oct. 2017, pp. 1-25.
Kay, et al., "The kinetics human action video dataset", In Journal of Computing Research Repository, May 2017, 22 Pages.

Ke, et al., "A New Representation of Skeleton Sequences for 3D Action Recognition", In Journal of the Computing Repository, Mar. 2017, 10 Pages.
Kemelmacher-Shlizerman, et al., "The MegaFace Benchmark: 1 million faces for recognition at scale", In Proceedings of the IEEE Conference on Computer Vision and Pattern Recognition, Jun. 27, 2016, pp. 4873-4882.
Kingma, et al., "Auto-encoding variational bayes", In Publication of arXiv preprint arXiv:1312.6114, Dec. 20, 2013, pp. 1-14.
Krizhevsky, et al., "ImageNet Classification with Deep Convolutional Neural Networks", In Journal of Advances in Neural Information Processing Systems, Dec. 3, 2012, pp. 1-9.
Li, et al., "Action Recognition Based on a Bag of 3D Points", In Proceedings of IEEE Computer Society Conference on Computer Vision and Pattern Recognition Workshops, Jun. 13, 2010, pp. 9-14.
Li, et al., "Generative moment matching networks", In Proceedings of 32nd International Conference on Machine Learning, Jul. 6, 2015, 10 Pages.
Lin, et al. "Microsoft COCO: Common Objects in Context", In Proceedings of European conference on computer vision, Sep. 2014, pp. 1-15.
Liu, et al., "Coupled generative adversarial networks", In Journal of Advances in neural information processing systems, Dec. 5, 2016, pp. 1-9.
Liu, et al., "Learning Human Pose Models from Synthesized Data for Robust RGB-D Action Recognition", In Journal of the Computing Research Repository, Jul. 2017, pp. 1-16.
Liu, et al., "Unsupervised Image-to-Image Translation Networks", In Proceedings of 31st Conference on Neural Information Processing Systems, Dec. 7, 2017, pp. 1-11.
Marszalek, et al., "Actions in context", In Proceedings of IEEE Conference on Computer Vision and Pattern Recognition, Jun. 2009, 8 Pages.
Mathieu, et al., "Deep Multi-Scale Video Prediction beyond Mean Square Error", In Journal of Computing Research Repository, Nov. 2015, pp. 1-14.
Meshry, et al., "Linear-time Online Action Detection From 3D Skeletal Data Using Bags of Gesturelets", In Proceedings of IEEE Winter Conference on Applications of Computer Vision, Mar. 7, 2016, 10 Pages.
Ng, et al., "Beyond short snippets: Deep Networks for video classification", In the Proceedings of IEEE Conference on Computer Vision and Pattern Recognition (CVPR), Jun. 7, 2015, pp. 4694-4702.
Nguyen, et al., "Plug & play generative networks: Conditional iterative generation of images in latent space", In Journal of Computing Research Repository, Dec. 2016, pp. 1-36.
Oh, et al., "Action conditional video prediction using deep networks in Atari games", In Advances in Neural Information Processing Systems, Jul. 2015, pp. 1-26.
Poppe, Ronald, "A Survey on Vision-Based Human Action Recognition", In Journal of Image and Vision Computing, vol. 28 Issue 6, Jun. 1, 2010, pp. 976-990.
Radford, et al., "Unsupervised Representation Learning with Deep Convolutional Generative Adversarial Networks", In Journal of the Computing Research Repository, Nov. 2015, pp. 1-16.
Rezende, et al., "Stochastic backpropagation and variational inference in deep latent gaussian models", In Proceedings of International Conference on Machine Learning, Jun. 2014, 15 Pages.
Ronneberger, et al., "U-Net: Convolutional networks for biomedical image segmentation", In Proceedings of International Conference on Medical Image Computing and Computer-Assisted Intervention, Oct. 5, 2015, pp. 1-8.
Saito, et al., "Temporal generative adversarial nets", In Journal of Computing Research Repository, Nov. 2016, 10 Pages.
Salimans, et al., "Improved techniques for training GANs", In Advances in Neural Information Processing Systems, Dec. 5, 2016, pp. 1-9.
Sato, et al., "APAC: Augmented PAttern classification with neural networks", In Journal of the Computing Research Repository, May 2015, 9 Pages.

(56) References Cited

OTHER PUBLICATIONS

Schuldt, et al., "Recognizing human actions: A local SVM approach", In Proceedings of 17th International Conference on Pattern Recognition, Aug. 23, 2004, 5 Pages.

Scovanner, et al., "A 3-dimensional sift descriptor and its application to action recognition", In Proceedings of 15th ACM international conference on Multimedia, Sep. 25, 2007, pp. 357-360.

Shahroudy, et al., "NTU RGB+D: A large scale dataset for 3d human activity analysis", In Proceedings of IEEE Conference on Computer Vision and Pattern Recognition, Jun. 27, 2016, pp. 1010-1019.

Simard, et al., "Best practices for convolutional neural networks applied to visual document", In Proceedings of 7th International Conference on Document Analysis and Recognition, Aug. 3, 2003, 6 Pages.

Zhang, et al., "StackGAN: Text to photo-realistic image synthesis with stacked generative adversarial networks", In Journal of the Computing Research Repository, Dec. 2016, 14 Pages.

Soomro, et al., "UCF101: A dataset of 101 human actions classes from videos in the wild", In Journal of the Computing Research Repository, Dec. 2012, 7 Pages.

Souza, et al., "Procedural Generation of Videos to Train Deep Action Recognition Networks", In Proceedings of IEEE Conference on Computer Vision and Pattern Recognition, Jul. 21, 2017, pp. 4757-4767.

Srivastava, et al., "Unsupervised learning of video representations using LSTMs", In Proceedings of 32nd International Conference on Machine Learning, Jul. 6, 2015, 10 Pages.

Szummer, et al., "Temporal Texture Modeling", In Proceedings of International Conference on Image Processing, Sep. 16, 1996, 4 Pages.

Tran, et al., "Learning spatiotemporal features with 3D convolutional networks", In Proceedings of IEEE International Conference on Computer Vision, Dec. 7, 2015, pp. 4489-4497.

Tulyakov, et al., "MoCoGAN: Decomposing motion and content for video generation", in Journal of Computing Research Repository, Jul. 2017, pp. 1-13.

Oord, et al., "Conditional image generation with PixelCNN decoders", In Proceedings of 30th Conference on Neural Information Processing Systems, Dec. 5, 2016, pp. 1-9.

Villegas, et al., "Decomposing motion and content for natural video sequence prediction", In Proceedings of 5th International Conference on Learning Representations, Apr. 24, 2017, pp. 1-22.

Vondrick, et al., "Generating Videos with Scene Dynamics", In Proceedings of 30th Conference on Neural Information Processing Systems, Dec. 5, 2016, pp. 1-9.

Walker, et al., "The Pose Knows: Video forecasting by generating pose futures", In Journal of Computing Research Repository, May 2017, 10 Pages.

Wang, et al., "Action Recognition Based on Joint Trajectory Maps with Convolutional Neural Networks", In Proceedings of the ACM on Multimedia Conference, Oct. 15, 2016, pp. 1-11.

Wang, et al., "Action recognition by dense trajectories", In Proceedings of 24th IEEE Conference on Computer Vision and Pattern Recognition, Jun. 20, 2011, pp. 3169-3176.

Wei, et al., "Fast texture synthesis using tree-structured vector quantization", In Proceedings of the 27th Annual Conference on Computer Graphics and Interactive Techniques, Jul. 23, 2000, pp. 479-488.

Wong, et al., "Understanding Data Augmentation for Classification: When to Warp?", In Proceedings of International Conference on Digital Image Computing: Techniques and Applications, Nov. 30, 2016, 6 Pages.

Xia, et al., "View invariant human action recognition using histograms of 3D joints", In Proceedings of IEEE Computer Society Conference on Computer Vision and Pattern Recognition Workshops, Jun. 16, 2012, 8 Pages.

Xue, et al., "Visual Dynamics: Probabilistic Future Frame Synthesis via Cross Convolutional Networks", In Proceedings of Annual Conference on Neural Information Processing Systems, Dec. 5, 2016, pp. 1-11.

Yun, et al., "Two-person interaction detection using body-pose features and multiple instance learning", In Proceedings of IEEE Conference on Computer Vision and Pattern Recognition Workshops, Jun. 16, 2012, 8 Pages.

Zhang, et al., "Learning Classifiers from Synthetic Data using a Multichannel Autoencoder", In Journal of the Computing Research Repository, Mar. 2015, pp. 1-11.

* cited by examiner

HUMAN ACTION DATA SET GENERATION IN A MACHINE LEARNING SYSTEM

BACKGROUND

The present disclosure relates generally to machine learning systems, and more particularly, to a human action data set generator for a machine learning system.

Applying deep learning techniques to solve standard computer vision problems has inspired researchers to propose new computer vision problems in different domains. Training data plays a significant role in machine learning processes, especially deep learning approaches which are data hungry. Training data is used during machine learning processes to provide numerous images and/or videos to train computer systems to distinguish between subject matter, such as objects, actions, and/or scenes, within the images and/or videos. In order to solve new problems using machine learning processes, a large amount of training data is required, which may, in many cases, pose logistical difficulties. One method of generating human action data sets includes asking subjects to perform a series of actions in front of a camera. However, this method is not scalable, as the amount of required data for training data purposes far exceeds the number of available subjects and the time available to perform the actions. Another method of generating human action data sets includes retrieving existing videos having labels that identify the actions performed in the videos. However, this method is limited based on the number of existing videos that have labels according to the needs of a required training data set.

Accordingly, more efficient systems and methods for obtaining data sets are needed in order to satisfy data requirements of machine learning processes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As described above, advanced machine learning techniques and training data require computational power and deep learning networks. Large data sets, such as thousands or millions of photos/videos of objects, animals, faces, or scenes, are required to enable complex neural networks to train successfully. However, in some cases, only small data sets are available, which does not provide enough data for a machine learning process. Common methods for generating additional data sets to be used for training data are limited by the number of subjects or environments available or by the similarity between an existing image/video and a desired image/video.

The present disclosure introduces a novel way to partition an action video clip into an action, a subject, and a context. Each part is manipulated separately and reassembled according the system using skeleton trajectory generation and video generation techniques as described below. These techniques enable, through the use of machine learning, the generation of an unlimited amount of action recognition training data to be used for machine learning. Further, these techniques enable the generation of video action clips from a small set of data sets without costly and time-consuming data acquisition. Lastly, we prove through extensive set of experiments on two small human action recognition data sets, that this new data generation technique can improve the performance of current action recognition neural nets.

Methods, apparatuses, and computer-readable mediums for generating human action data sets are disclosed by the present disclosure. In an aspect, the method may include receiving a set of reference images, where each of the images within the set of reference images includes a person; identifying body parts of the person from the set of reference images; generating a transformed skeleton image by mapping each of the body parts of the person to corresponding skeleton parts of a target skeleton; generating a mask of the transformed skeleton image; receiving a background image; and generating, using a machine learning frame generator, a frame of the person formed according to the target skeleton within the background image, the machine learning frame generator being trained based on the target skeleton, the mask of the transformed skeleton image, and the background image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
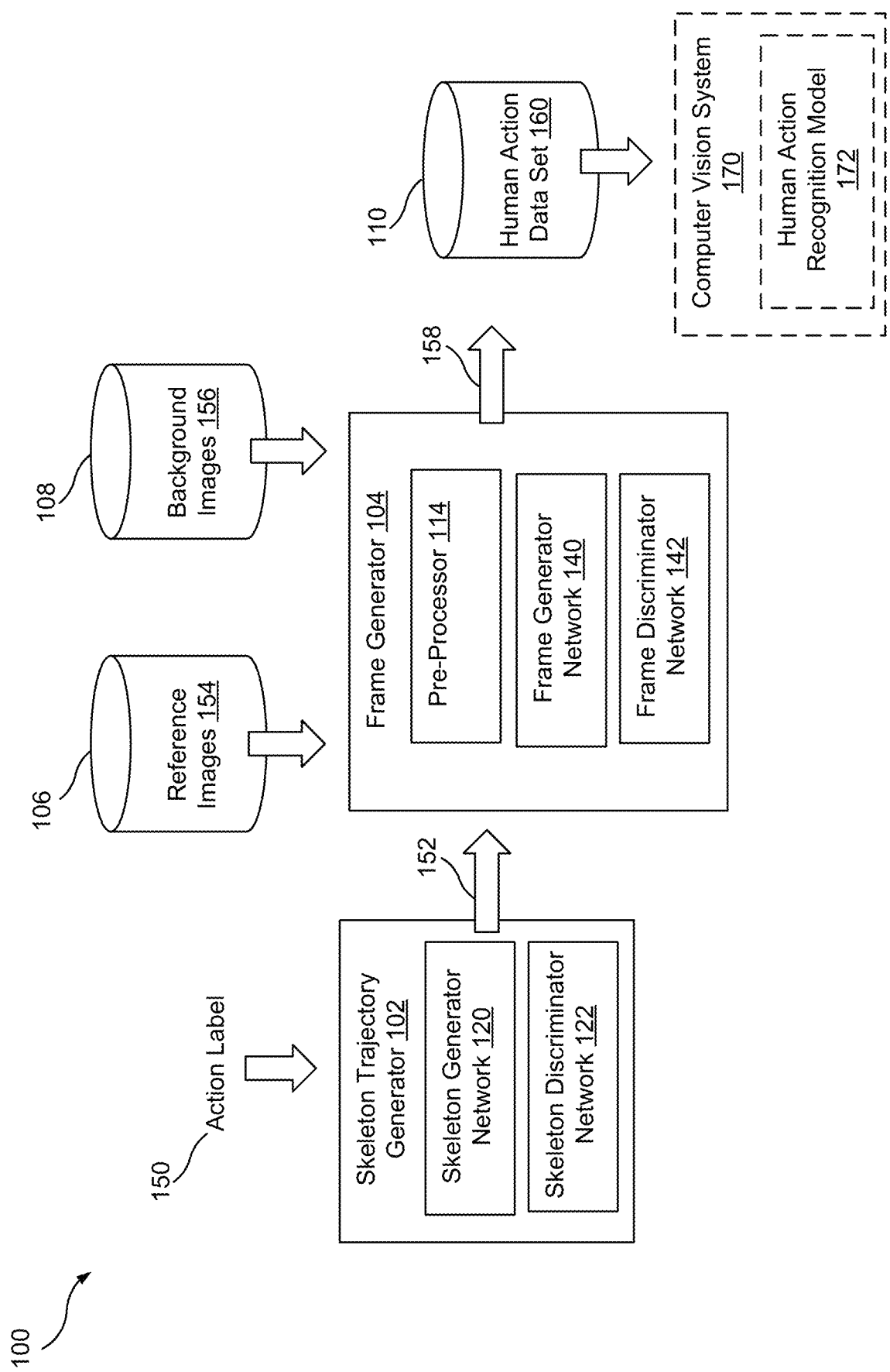
FIG. 1 is a block diagram of an example of a system for generating a human data set according to aspects of the present application.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Herein, the present disclosure introduces a novel system that partitions an action video clip into an action, a subject, and a context. The system can manipulate each part separately and reassemble the manipulated parts using skeleton trajectory generation and video generation techniques as described below to create human action data sets for training a machine learning-based computer vision system.

Methods, apparatuses, and computer-readable mediums for generating human action data sets for machine learning-based human action recognition computer vision systems are disclosed. The system takes as input an action label, a set of reference images, and an arbitrary background. The output is a generated video of the person in the reference image performing a given action. In a first aspect, the system includes a generative model trained on a small labeled dataset of skeleton trajectories of human actions, and generates a sequence of human skeletons conditioned on the action label. In a second aspect, the system includes another generative model trained on an unlabeled set of human action videos, which generates a sequence of photo-realistic frames conditioned on the given background, generated skeletons, and the person's appearance given in the reference frames. This system can be operated to produce any number of human action videos, which can then be added to a data set used to train a machine learning-based computer vision system.

In other words, in a particular implementation, the system may include receiving a set of reference images, where each of the images within the set of reference images includes a person. The system may then include identifying body parts of the person from the set of reference images, and generating a transformed skeleton image by mapping each of the body parts of the person to corresponding skeleton parts of a target skeleton. The system further includes generating a mask of the transformed skeleton image. The system may then include receiving a background image, and generating, using a machine learning frame generator, a frame of the person formed according to the target skeleton within the background image. The machine learning frame generator being trained based on the target skeleton, the mask of the transformed skeleton image, and the background image.

Thus, the system merges transformed images of a person on an arbitrary pose with an arbitrary background in a natural, photorealistic way.

The disclosed solution enables generation of human action video clips from a small set of original human action video clips without costly and time-consuming data acquisition. Moreover, by independently modeling action, subject, and context, the disclosed solution can generate any number of human action videos with varying backgrounds, human appearances, actions, and ways each action is performed. Further, through use of the generative model trained on a small labeled dataset of skeleton trajectories of human actions as described above with the first aspect, the system described herein may allow the use of unlimited unlabeled human action videos in training. Thus, this new data generation technique can improve the performance of current machine learning-based human action recognition computer vision systems, which may be used in, for example, security surveillance, sports analysis, smart home devices, and health monitoring.

Turning now to FIGS. 1-9, examples are depicted with reference to one or more components and one or more methods that may perform the actions or operations described herein, where components and/or actions/operations in dashed line may be optional. Although the operations described below in one or more of the methods are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 includes an example of a system 100 for generating a human action data set 160, which may be used to train a human action recognition model 172 of a computer vision system 170. FIGS. 2-7 include specific examples of inputs, outputs, and methods used by the system and are referenced throughout the description of FIG. 1.

Figure 3B:
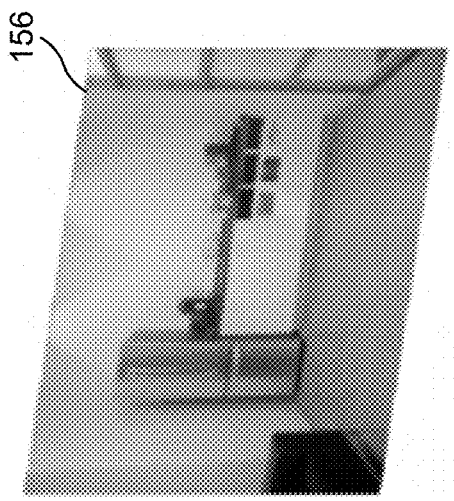
FIG. 3B is an example of an arbitrary background image used as input for the system of FIG. 1 according to aspects of the present application.

As an overview, the system 100 may receive as input an action label 150 (e.g., "sit"), a set of reference images 154, each including a person 300 (see e.g., FIG. 3A), and an arbitrary background image 156 (see e.g., FIG. 3B). Based the input, the system 100 may generate a frame 158 (see e.g., FIG. 5B) which is an image of the arbitrary background 156 including the person 300 in a position associated with the action label 150. The frame 158 may be one of a sequence of frames, e.g., associated with a skeleton trajectory that defines the action identified by the action label 150, and may be used for expanding a human action data set 160 used by a computer vision system 170 for human action recognition.

In an implementation, the system 100, which may be implemented in one or more computer devices, includes a skeleton trajectory generator 102 configured to generate a skeleton trajectory 152 for a frame generator 104 based on a received action label 150. The action label 150 refers to a human action such as, but not limited to, sitting-down, standing-up, walking, throwing, pushing, pulling, hand-waving, carrying, hand-clapping, or any other action that a person may perform.

Figure 2B:
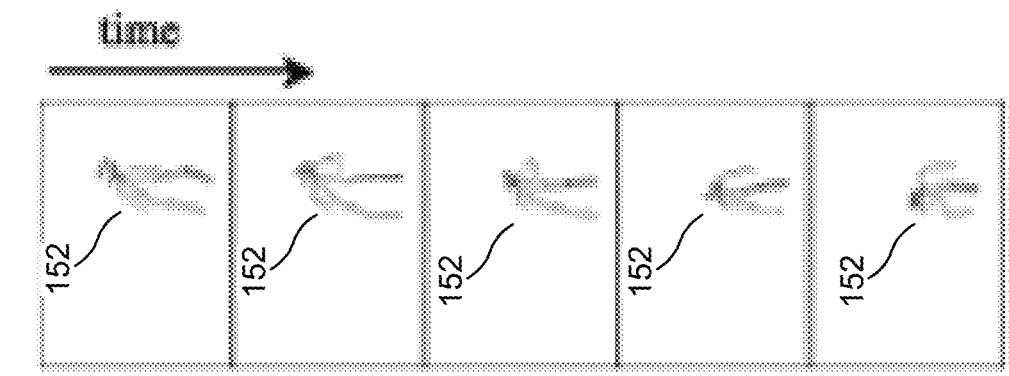
FIG. 2B is an example of a sequence of a skeleton trajectory associated with the action label "sit," generated by the system of FIG. 1 according to aspects of the present application.
Figure 2A:
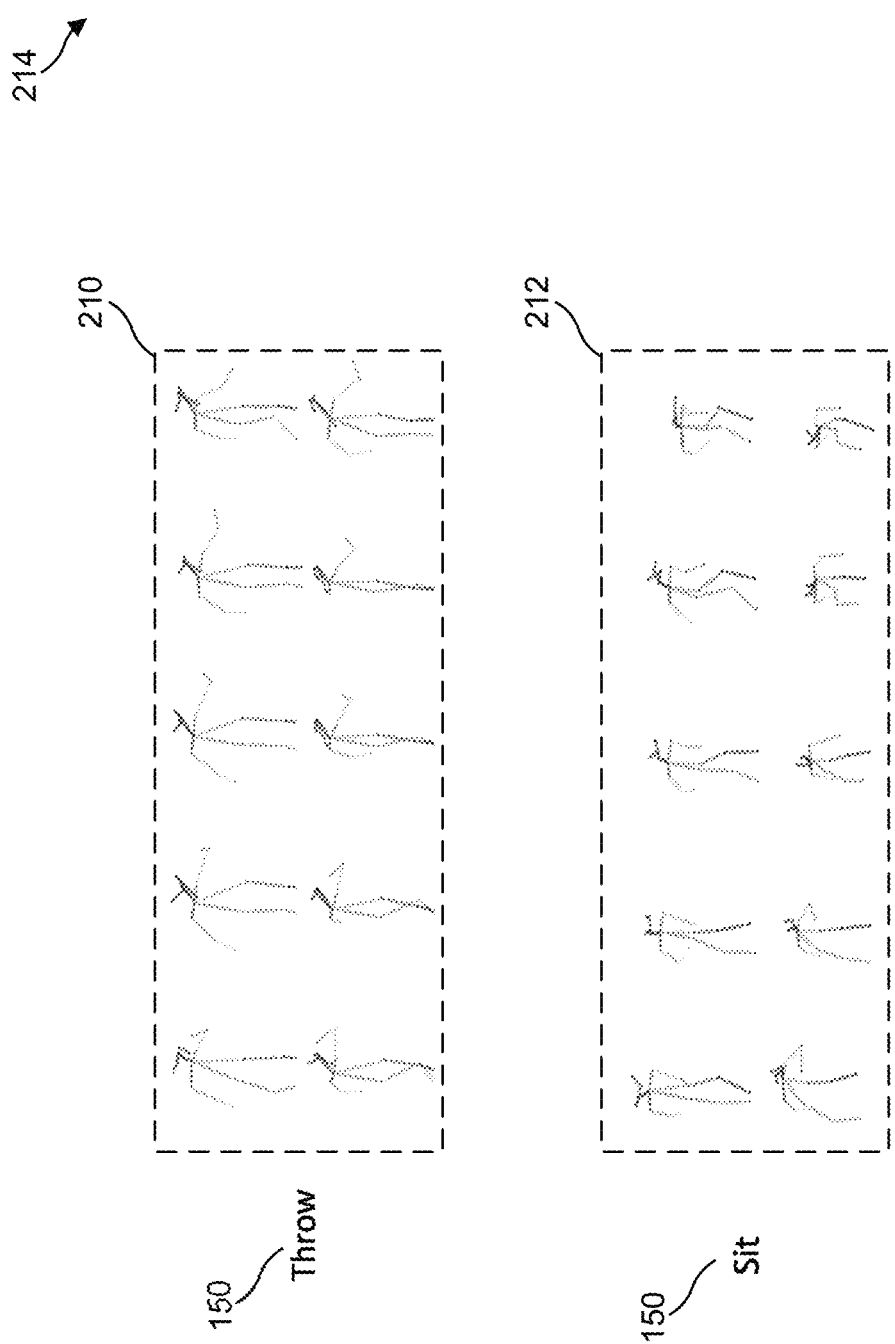
FIG. 2A are examples of skeleton trajectories generated by the system of FIG. 1 according to aspects of the present application.

The skeleton trajectory 152 refers to a set of skeletons performing actions associated with the action label 152. For example, as illustrated by FIG. 2A, when the skeleton trajectory generator 102 receives the action label 150 of "throw," one or more sets of skeletons 210 (e.g., two sets in this example) define body positions associated with the different actions or movements associated with the "throw" action label. As another example, as illustrated by FIG. 2A, when the skeleton trajectory generator 102 receives the action label 150 of "sit," the skeleton trajectory 152 may include one or more sets of skeletons 212 (e.g., two sets in this example) defining body positions associated with performing different actions or movements associated with the "sit" action label.

The frame generator 104 is configured to generate a frame 158 (or sequence of frames) including a person 300 in an arbitrary background image 156 performing at least a portion of an action (or, for the sequence of frames, an entire action) associated with the action label 150. In an example, the system 100 may add the frame 158 (or sequence of frames) to the human action data set 160, which may be stored in a human action data set storage 110, e.g. a memory or data store.

The skeleton trajectory generator 102 may use machine learning to generate a skeleton trajectory 152 (see e.g., FIG. 2A) according to the action label 150. Further, the skeleton trajectory generator 102 may generate a sequence 214 of the skeleton trajectories 152 over time (see e.g., FIG. 2B), which indicate a range of body positions corresponding to actions that a person performs sequentially in time while performing the action associated with the action label 150. For example, as shown by FIG. 2B, the skeleton trajectory generator 102 may receive the action label 150 of "sit" as an input and the output may include the skeleton trajectories 152 performing the act of sitting according to the sequence 214.

In an example, the skeleton trajectory generator 102 may use a skeleton generator network 120 for generating the skeleton trajectory 152. In an example, the skeleton generator network 120 may be a conditional generative adversarial network (GAN). The skeleton generator network 120 may predict a distribution of sequences of skeleton trajectory 152 conditioned on the action label 150. In an example, each of the skeletons of the skeletons trajectory 152 may comprise a predetermined number of joints (e.g., 18 joints) and may be represented by a predetermined vector (e.g., 1×36). Further, coordinates of each of the skeletons of the skeleton trajectory 152 may be normalized. For example, the coordinates of each of the skeletons of the skeleton trajectory 152 may be normalized by dividing the coordinates by a height and width of an original image.

In some examples, the skeleton generator network 120 may use a "U" shape architecture that receives the action label 150 and, optionally, a random noise vector ("z"), where the output of the skeleton generator network 120 may be an predetermined tensor (e.g., an 8×1×36 tensor) representing the skeleton trajectories 152 having a number of time-steps (e.g., 8 time steps). The random noise vector (e.g., an 8×1×128 tensor, drawn from a uniform distribution) may be provided for each time step, which may assist the skeleton generator network 120 in learning and generalizing. In an aspect, the action label ("l") 150 may be a one-hot encoded, and is replicated and concatenated to the 3rd dimension of the z. The remainder of the skeleton generator network 120 may be a "U" shaped network with skip connections that maps the input (z,l) to a skeleton sequence ("S").

In an example, the skeleton generator network 120 may perform machine learning to generate the skeleton trajectory 152. An objective function of the skeleton generator network 120 may be as follows:

$$\mathcal{L}_T(G,D) = \mathbb{E}_{l,s \sim P_{data}(l,s)}[\log D(l,s)] = \mathbb{E}_{l \sim P_{data}(l), z \sim P_z(z)}[1 - \log D(l, G(l,z))]$$

where $L_T$ is the objective function for skeleton trajectory, G is the skeleton generator network 120, D is the skeleton discriminator network 122, $P_{data}$ is training data of l and s, $P_z$ is training data for z, l is the action label 150, s is the skeleton trajectory, and z is a random noise value. Based on the objection function, the skeleton generator network 120 may optimize the skeleton trajectory 152 according to optimized generator model, G*:

$$G^* = \arg \min_G \max_D \mathcal{L}_T(G, D)$$

The skeleton trajectory generator 102 may also use a skeleton discriminator network 122 for determining whether the skeleton trajectory 152 is human looking. In an example, during generation of the skeleton trajectory 152, the system 100 uses the skeleton generator network 120. However, when performing machine learning training, the system 100 may use both the skeleton generator network 120 and the skeleton discriminator network 122.

In an example, the skeleton discriminator network 122 may use a base having a predetermined convolutional neural network along a time dimension. For example, the skeleton discriminator network 122 may distinguish between human skeletons and non-human skeletons using one or more of a sigmoid layer or a fully-convolutional network. In some examples, the skeleton discriminator network 122 may distinguish between trajectories using a set of convolutions, such as a convolution stride, along the time. In an implementation, for instance, the architecture of skeleton discriminator network 122 is three-fold. The base for skeleton discriminator network 122 is a one dimensional ("1D") convolutional neural net along the time dimension. In order to allow skeleton discriminator network 122 to distinguish "human"-looking skeletons, the system may use a sigmoid layer on top of fully-convolutional neural net. To discriminate "trajectory," skeleton discriminator network 122 may use a set of convolutions along the time with stride 2, shrinking output to one 1×1×Dim containing features of the whole sequence, where Dim is the dimension of the skeleton trajectory 152. To prevent mode collapse, the system may group the fully convolutional net outputs across batch dimension. Then, the system may use min, max and mean operations across the batch dimension, and provide this statistical information to skeleton discriminator network 122. This technique can provide enough information about distribution of values across batches and allows for changing of batch size during training.

Figure 3A:
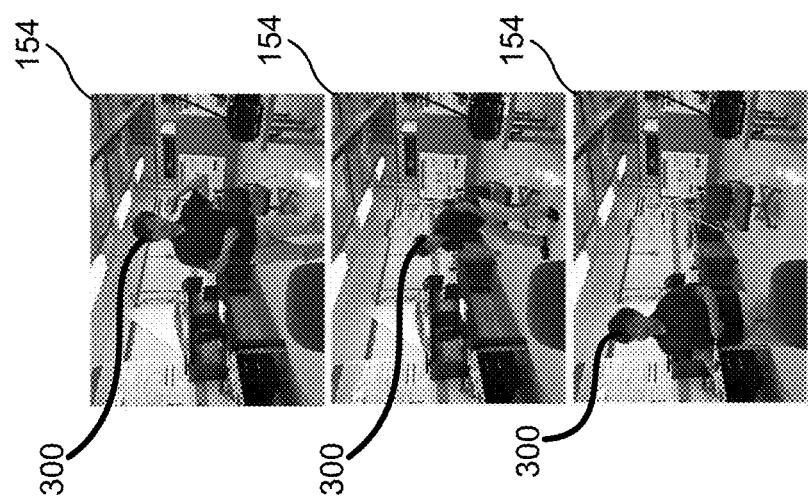
FIG. 3A is an example of a set of reference images used as input for the system of FIG. 1 according to aspects of the present application.

As shown by FIG. 1, the frame generator 104 is configured to receive the skeleton trajectory 152 from the skeleton trajectory generator 102, a set of reference images 154 (see e.g., FIG. 3A) from a reference image storage 106 (e.g. a memory or data store), and an arbitrary background image 156 (see e.g., FIG. 3B) from a background storage 108 (e.g. a memory or data store). While the set of reference images 154 may include a single reference image, this single reference image may not have all of the appearance information due to occlusions in some poses (e.g., a face not be visible in a certain pose). As such, in some cases, the set of reference images 154 may include a plurality of images having the same person 300 in each of the images, as shown by FIG. 3A. The person 300 may be in different poses or locations or performing different actions in the set of reference images 154 to provide additional angles and views of the person. In an example, the set of reference images 154 may be selected at random or using a heuristic to produce different appearance features of the person.

The frame generator 104 may include a pre-processor 114 configured to extract body parts (see e.g., FIG. 4A) of the person from the images in the set of reference images 154. In an example, extraction of human skeletons may include identifying the different body parts of the person in all of the images of the set of reference images according to skeleton parts. For example, as shown by the example of FIG. 4A, an overlay of the skeleton parts 400 identifies body parts of the person 300 in each of the reference images 154. In an example, extraction of human skeletons may be performed using human pose estimation or another forms of localizing anatomical parts.

Figure 4B:
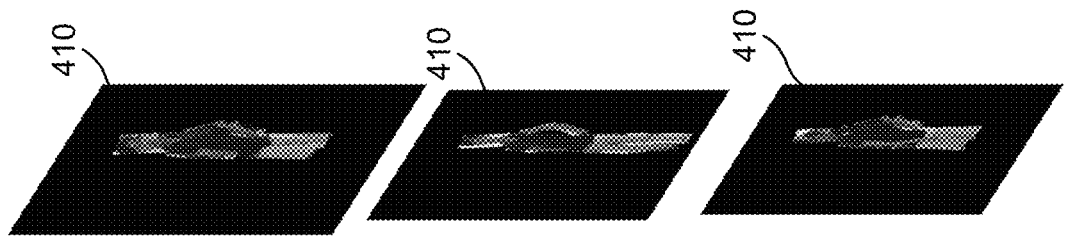
FIG. 4B is an example of body parts of the person from a set of reference images after having been mapped to a target skeleton by the system of FIG. 1 according to aspects of the present application.
Figure 4A:
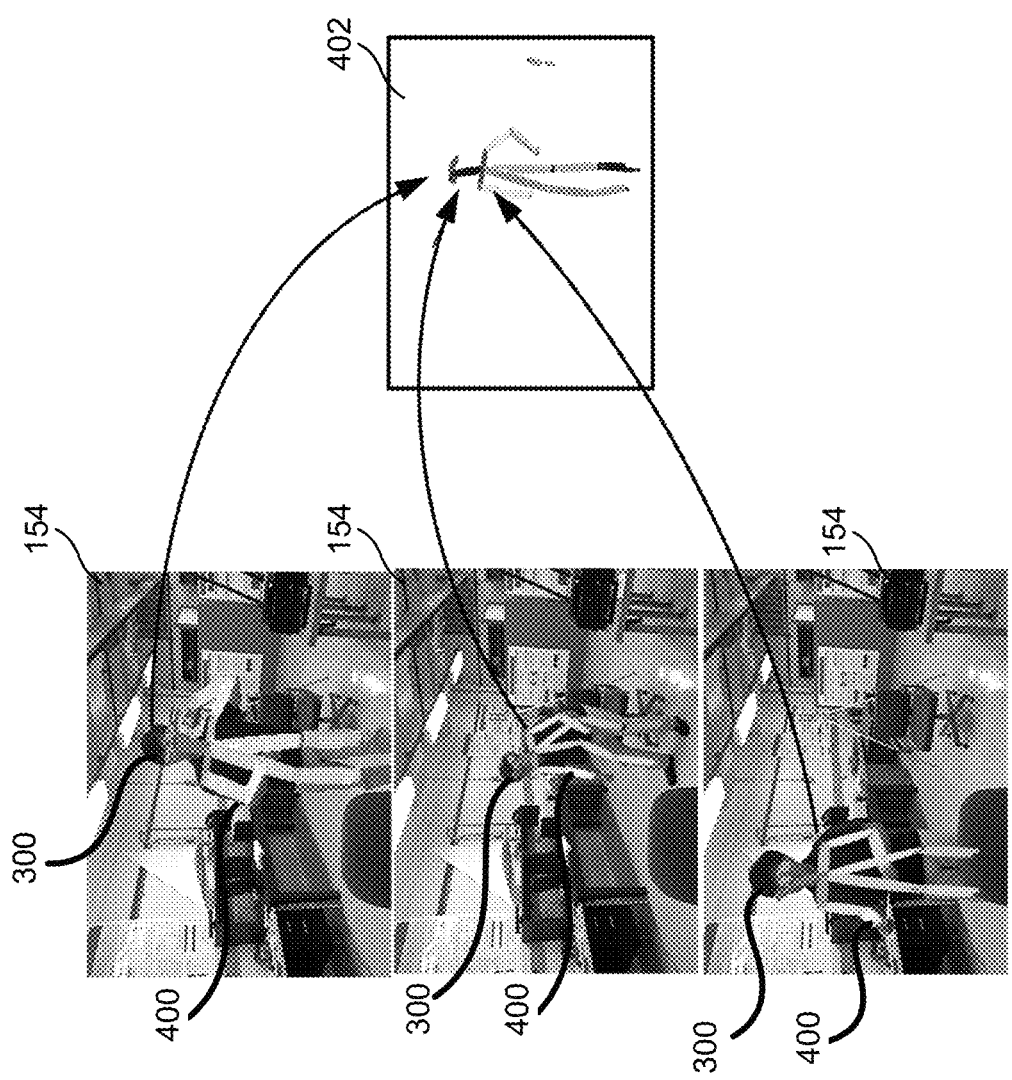
FIG. 4A is an example of an operation of extracting a skeleton performed by the system of FIG. 1 according to aspects of the present application.

After identifying the skeleton parts 400 of the person 300 in each image of the set of reference images 154, the pre-processor 114 maps the identified body parts of the person 300 to a target skeleton of the skeleton trajectory 152 to generate a transformed skeleton 410, as shown in FIG. 4B. For example, as shown by the example of FIG. 4A, each body part of the person 300 may be mapped to a corresponding target skeleton 402 of the skeleton trajectory 152. Each of the images of the set of reference images 154 may be mapped to the target skeleton 402 of the skeleton trajectory 152 to form each of the transformed skeletons 410 (i.e., one to one generation). However, in another example, the two or more images of the set of reference images 154 may be mapped to a single target skeleton of the skeleton trajectories 152 such that a number of transformed skeletons 410 is less than a number of images of the set of reference images 154.

Figure 5B:
FIG. 5B is an example of a frame generated by the system of FIG. 1 according to aspects of the present application.
Figure 5A:
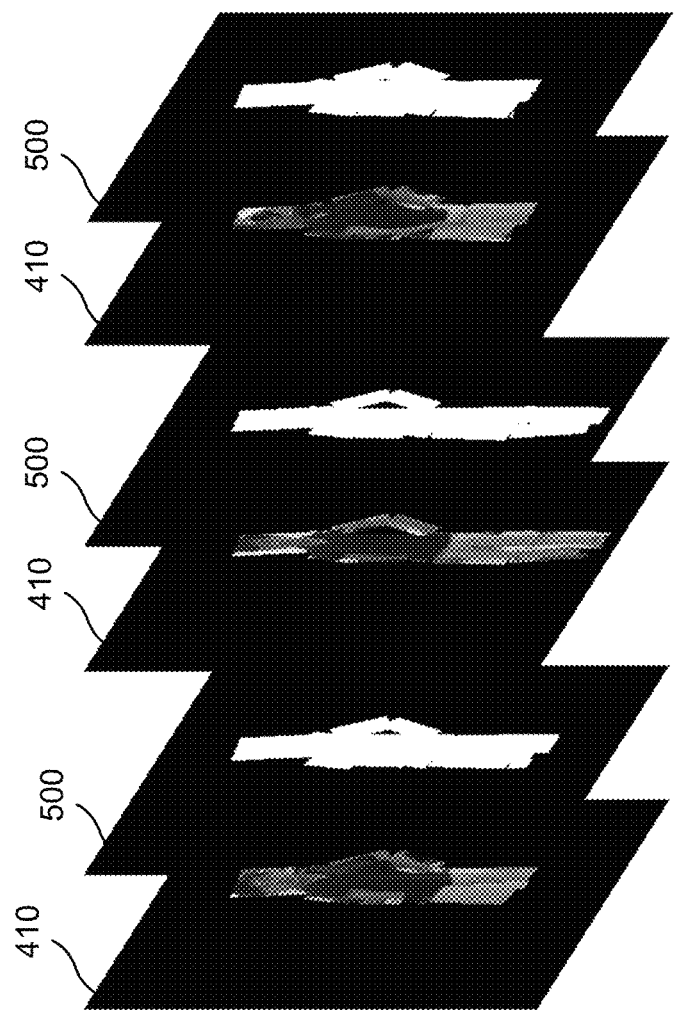
FIG. 5A is an example of a mask used by the system of FIG. 1 according to aspects of the present application.

In an example, the mapping of the extracted human skeleton may be performed using an offline transform to map the RGB pixel values of each skeleton part 400 from an image of the set of reference images 154 to the skeleton trajectory 152. The pre-processor 114 is also configured to generate a mask 500 (see FIG. 5A) of the transformed skeleton 410 at a location on the corresponding image of the set of reference images 154. For example, as shown in FIG. 5A, the mask 500 may set the pixel values of the background in each of the reference images 154 such that the background is black, without changing pixel values of the location of transformed skeleton 410. The mask 500 may be a binary mask, as shown by FIG. 5A.

In an example, the frame generator 104 may use machine learning to generate the frame 158 based on the pre-processed data. The frame generator 104 may include a frame generator network 140 and a frame discriminator network 142 for machine learning. The frame generator network 140 may be conditioned on the skeleton trajectory 152, the transformed skeleton(s) 410 and corresponding mask(s) 500, and the arbitrary background image 156. In an example, the frame generator network 140 may be a conditional GAN. In an example, during generation of the frame 158, the system 100 uses the frame generator network 140. However, when performing machine learning training, the system 100 may use both the frame generator network 140 and the frame discriminator network 142.

In an example, the frame generator network 140 may perform machine learning according to G(C), where the frame generator network 140 is G conditioned on C, where:

$$C=\{\bar{I}_1^t, \ldots, I_k^t, B, S_i\}$$

where C is conditions or input data for training the frame generator network 140. The conditions being: $I_k^t$ is an image of the set of images 154 having a total of k images sequentially ordered a time t, B is the background image 156, and the skeleton trajectory 152 is $S_i$ having a total of i skeleton trajectories.

In an example an objective function of the frame generator network 140 may be as follows:

$$\mathcal{L}_{GAN}(G,D) = \mathbb{E}_{c,y \sim P_{data}(c,y)}[\log D(c,y)] + \mathbb{E}_{c \sim P_{data}(c), z \sim P_z(z)}[1-\log D(c,G(e,z))]$$

where $L_{GAN}$ is the objective function for generating the frame 158, D is the frame discriminator network 142, c is the conditions or input data described above, and y is a target frame. In an optional implementation, to increase sharpness of a frame, a loss $L_1$ with weighting factors may be added to the objective function according to:

$$\mathcal{L}_{L1}(G) = \mathbb{E}_{c,y \sim P_{data}(c,y), z \sim P_z(z)}[\|y-G(c,z)\|]$$

where $L_{L1}$ is the object function of the L1 loss. In another optional implementation, regional losses R with a weighting factor may be added to the objective function (or subsequent to the loss $L_1$ being added) to target the person within an image and increase the sharpness of the person within an image according to:

$$\mathcal{L}_R(G) = \mathbb{E}_{c,y \sim P_{data}(c,y), z \sim P_z(z)}[\|\text{masked}(y) - \text{masked}(G(e,z))\|]$$

where $L_R$ is the objective function for the regional loss R and "mask" represents the mask 500 to mask out the region where the person was located. The mask may be generated based on the skeleton trajectory 152 ($S_i$) using morphological functions, such as but not limited to erode or another morphological erosion function. A resulting objective may be according to:

$$\mathcal{L}(G,D) = \mathcal{L}_{GAN}(G,D) + \lambda \mathcal{L}_{L1}(G) + \beta \mathcal{L}_R(G)$$

where λ and β are weighting factors of the loss $L_1$ and the regional losses R. In an example, β may be greater than λ.

The frame generator network 140 may optimize the objection function optimize according to:

$$G^* = \arg \min_G \max_D \mathcal{L}(G, D)$$

The frame generator network 140 may perform the frame generation to avoid being labeled as a fake image by the frame discriminator network 144. The frame discriminator network 144 is a machine learning network trained to distinguish between real images and fake images. In this case, the objective is that the frame generator network 140 generates the frame 158 to deceive the frame discriminator network 144 into determining that the frame 158 is a real image.

As described above, the skeleton generator network 120, the skeleton discriminator network 122, the frame generator network 140, and the frame discriminator network 142 may use machine learning models based on supervised learning, unsupervised learning, or a combination of both. In training the machine learning model using supervised learning, the model is presented with example, labeled inputs and their desired outputs so that the model is trained to learn a general rule that maps inputs to outputs. In training the machine learning model using unsupervised learning, no labels are given to the machine learning model such that the model determines on its own the structure of the input, where the model can discover hidden patterns in the input and/or learn more about predicting certain features (e.g., if the model has already be through supervised learning).

For example, as described above the skeleton generator network 120 may generate the skeleton trajectory 152, which is not previously known to the skeleton generator network 120 or the frame generator network 140, and may generate the frame 158, which is not previously known to the frame generator network 140. In another example, the skeleton discriminator network 122 and the frame discriminator network 142 may generate outputs not previously known to these networks.

Further, for example, in some implementations, the skeleton generator network 120, the skeleton discriminator network 122, the frame generator network 140, and the frame discriminator network 142 may be first trained using supervised learning. In this implementation, the machine learning model may use data sets, as described in the experimentations below, for training respective machine learning models on how to generate a skeleton trajectory or a frame or how to determine whether an image is human looking or an image is realistic.

According to the above disclosure, these generative models can be adopted to learn human skeleton trajectories. According to the experiments, described below, the system 100 trained a conditional GAN on a very small data set (e.g., 200 sequences) and was able to generate natural looking skeleton trajectories conditioned on action labels. Accordingly, the system 100 can be used to generate a variety of human action sequences that do not exist in the original data set. The above disclosure further describes that, in addition to the generated skeletons, the system 100 can also use real skeleton sequences from other sources (other data sets, current data set but different subjects) to largely expand existing data sets.

Figure 7:
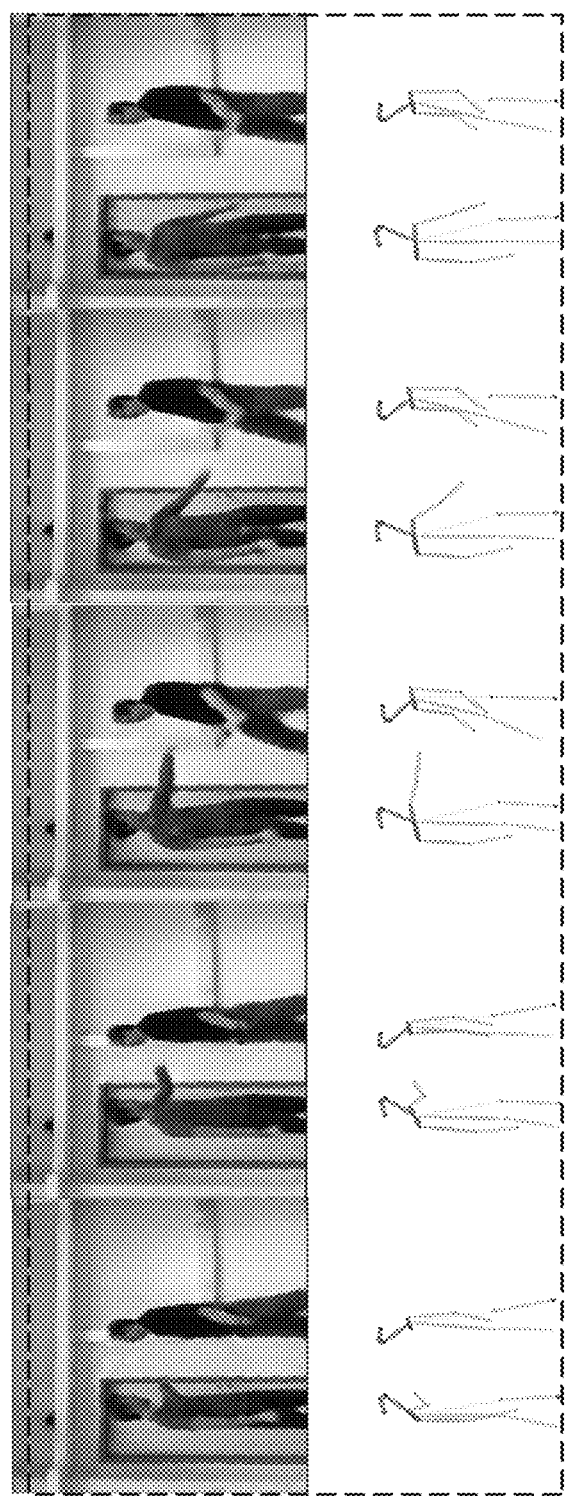
FIG. 7 is an example of a sequence of frames having more than one person in respective skeleton trajectories generated by the system of FIG. 1 according to aspects of the present application.

While examples have been described as generating a single person frame/video, aspects of the present disclosure are not limited to a single person. In some aspects, systems and methods of the present application are configured to generate multi-person frames/video, as shown by FIG. 7. To generate a multi-person frame, the frame generator 104 recognizes each person in an image of the set of reference images 154 and identifies a corresponding skeleton trajectory 152 for each person, such that during the extracting the human skeleton the skeleton parts are mapped from a first person to a corresponding first skeleton trajectory, from a second person to a corresponding second skeleton trajectory, and so forth. Recognition of each person in an image of the reference images 154 and corresponding skeleton trajectory 152 for each person may be through machine learning using methods previously discussed.

Experimentations

As explained above, the frame 158 (or sequence of frames) may be used to generate new data sets or expand existing data sets used during machine learning training for human action recognition, such as for use in training human action recognition model 172 of computer vision system 170. In implementation of the above systems and methods, common action recognition data sets, such as the UT Kinects, SUB interact, and KTH data sets, were used along with common deep learning networks, such as Convolution 3D (C3D) and Inflated 3D ConvNets (I3D), for action recognition. In this case each of the action recognition data sets include a relatively low number of action clips, where each includes a unique set of data sets.

The UT Kinects data set is a human activity recognition data set developed by researchers from the University of Texas and captured by a KINECT sensor available from Microsoft Corporation. The UT Kinects data set includes 10 action labels including walk, sit-down, stand-up, throw, push, pull, wave-hand, carry, and clap-hands. The UT Kinects data set also includes 10 subjects that perform each of these actions twice in front of a rig of RGB camera and Kinect. This means the UT Kinects data set includes a total of 200 action clips of RGB and depth data (however depth data is ignored for purposes of the following experiments). All videos in the UT Kinects data set were taken in an office environment with similar lighting conditions and the positions of the camera was fixed. For the training setup, 2 random subjects were left out (20%, used for testing) and the experiments were carried out using 80% of the subjects. The reported results are the average of six individual runs. Results of the 6 train/test runs were constant throughout the experiments.

The SUB Interact data set is a human activity recognition data set, captured by a KINECT sensor available from Microsoft Corporation, containing videos depicting two-person interactions. The Sub Interact data set contains 294 sequences of 8 classes with subject independent 5-fold cross validation. The classes include kicking, punching, hugging, shaking-hands, approaching, departing, and exchanging objects. The original data of the SUB Interact data set includes videos including RGB, depth, and skeleton data. However, only RGB data was used for purposes of the experiments. A 5-fold cross validation was used throughout the experiments and reported the average accuracy.

The KTH data set is a human activity recognition data set containing videos of human activities. The KTH data set is commonly used at the early stage of action recognition. The KTH data set includes 600 low resolution video clips of 6 actions: walk, wave-hand, clap-hands, jog, run, and box. The KTH data set has the video clips divided in train, test, and validation.

The deep learning network, C3D, is a simple and efficient 3-dimensional conventional neural network (ConvNet) for spatiotemporal feature which shows decent performance on video processing benchmarks such as action recognition in conjunction with large amount of training data. In the following experiments, The C3D was used with 8 convolutional layers, 5 pooling layers, and 2 fully connected layers having 16-frames of 112×112 RGB input.

The I3D is a more complex deep learning network model for action recognition tasks than the C3D. The I3D builds upon Inception-v1, but includes filters and pooling kernels for 3D. The I3D is a two-steam network which uses both RGB and optical flow input with 224×224 inputs. For purposes of the experiments, only the RGB was used for simplicity. In the experiments, two types of I3D were used, a pre-trained network using ImageNet, which is a deep learning network used for benchmark testing, followed by the Kinetics, and one trained based on an experiment performed from scratch. Tables herein denote both of these types of I3D using I3D(p) to denote that the I3D was pre-trained and I3D(s) to denote that the I3D was from a scratch experiment.

In the experiments, described below, the skeletons were trained using data from UT Kinect and SUB Interact data sets as well as 41 un-annotated clips (between 10 to 30 seconds) that we captured for purposes of the experiments. Further, data augmentation was used in the experiments by translation and clipping. For training purposes, only the original clips were used for testing, making sure there was no generated clips with skeletons or subjects (subject pair) from test data in each run.

Figure 6:
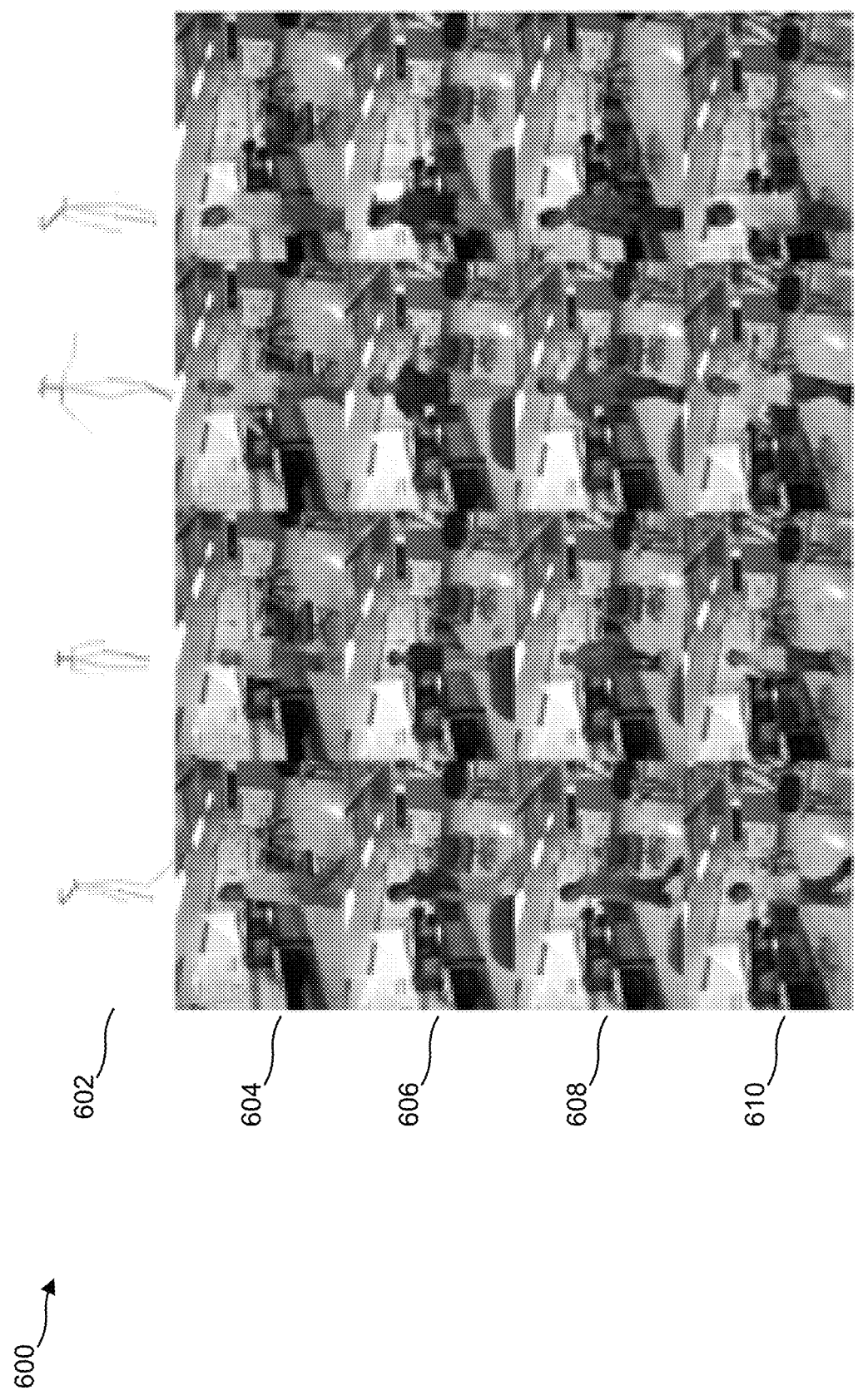
FIG. 6 is an example of frames of different people in different skeleton trajectories generated by the system of FIG. 1 according to aspects of the present application.

During a first experiment, the skeleton trajectory generator 102, described above, was trained using the above action recognition data sets. As a result, around 200 random skeleton trajectories were generated using the action labels in the UT Kinect data sets alone. Each of the skeleton trajectories were used by the frame generator 104, which was trained using the I3D and C3D. An example 600 of frames of the video is illustrated in FIG. 6. The example 600 includes a row 602 of skeleton trajectories 152, where the row includes four unique actions. The remaining rows 604-610 each include a person generated to perform the action of the corresponding skeleton trajectory, where each of the rows 604-610 includes the image of a person different from the remaining rows. Table 1 below shows about 3% improvement for I3D with and without training data as well as significant improvement by about 15% for C3D which is less complex.

TABLE 1

| Method | Org. | Org. + Gen. |
|---|---|---|
| I3D(s) | 64.58% | 67.50% |
| I3D(p) | 86.25% | 89.17% |
| C3D(p) | 55.83% | 70.83% |

During a second experiment, new subjects were used to expand data sets. In this second experiment, the systems and methods described above used unannotated clips obtained using 10 distinct persons. The diversity in body shape, cloths, and behavior help with the generalization of machine learning methods. For the UT Kinect data set, each subject was replaced by a new one for all of his/her action which is similar to adding 10 new subjects to UT Kinect data set. The same was done with SUB interact data set to double the data set, the only difference being the replacement each pair with a new subject pair. The results of the second experiment are shown below.

TABLE 2

| | UT | | SBU | |
|---|---|---|---|---|
| | Org. | Exp. | Org | Exp |
| I3D(s) | 64.58% | 67.08% | 86.48% | 91.23% |
| I3D(p) | 86.25% | 89.17% | 97.30% | 98.65% |
| C3D(s) | — | — | 83.52% | 87.00% |
| C3D(p) | 55.83% | 70.43% | 92.02% | 96.25% |

During a third experiment, new action labels were generated for a data set. In real action recognition problems by a computer, a new label class may be added after the data collection process has been done. Adding a new action label to a valid data set could cost the same as gathering a new data set from scratch as all the subjects are needed for re-acting a single action. As previously described, the UT consists 10 action labels. During the experiment, training data from the KTH data set was used in order to generate 3 new actions: running, jogging, and boxing, in addition to the actions of the UT Kinect data set. For each subject in UT Kinect data set and each of these 3 new action, 5 action clips were randomly picked from the training data clips of the KTH data sets, the skeleton was extracted using OpenPose, which is an application for extracting skeleton points from an image, and a random background image were used. As a result, 150 new action clips were generated from the new action labels. Next, a new model was trained using I3D by pre-trained network where in each run the training data was trained from pre-trained data set and all the data generated for the new set of actions. Since the KTH data is grey scaled images, both the original and the generated training clips in the training phase were randomly grey scaled. For each test run, per class accuracy for UT Kinect and KTH data sets were found as shown by Table 3, which includes average of the per class accuracy for both tests.

TABLE 3

| Action | UTK Test | Label | KTH Test |
|---|---|---|---|
| Walk | 91.67% | Walk | 67.18% |
| Wave-hand | 100.0% | Wave-hand | 58.59% |
| Clap-hand | 91.67% | Clap-hand | 28.90% |
| Push | 33.33% | Boxing | 72.14% |
| Pull | 58.33% | Running | 44.44% |
| Pick-up | 100.0% | Jogging | 63.20% |
| Sit-down | 87.50% | | |
| Stand-up | 95.83% | | |
| Threw | 54.17% | | |
| Carry | 79.17% | | |

The experiments describe above have shown that using the described systems and methods can generate video clips with any number of arbitrary action videos and subjects. In an action data set with N subjects carrying out M distinct actions, there will be M×N video actions. When applied to the systems and methods of the present disclosure, the N subjects and the M×N video actions will result in generation of M×N2 video actions comprising of M×N original videos while the rest is generated videos. By using this approach, UT Kinect data set was expanded from 200 clips to 4000 clips and the SUB Interact data set was expanded from 283 clips to 5943 using only the original data sets. I3D and C3D were then trained using the expanded data sets using the systems and methods described herein. Table 4 shows the result of this experiment.

TABLE 4

| | UTK | | SBU | |
|---|---|---|---|---|
| | Org. | Exp. | Org | Exp. |
| i3d(s) | 64.58% | 69.58% | 86.48% | 93.54% |
| i3d(p) | 86.25% | 90.42% | 97.30% | 99.13% |
| c3d(s) | — | — | 83.52% | 86.03% |
| c3d(p) | 55.83% | 71.25% | 92.02% | 97.41% |

Thus, the system described above may collect diverse sets of data to be used with various generative models. Further, the system partitions the video to action, subject and context portions, which allows easily manipulation of the background or change of the camera view (e.g., by applying a perspective transform on the skeleton) while using diverse backgrounds.

Figure 8A:
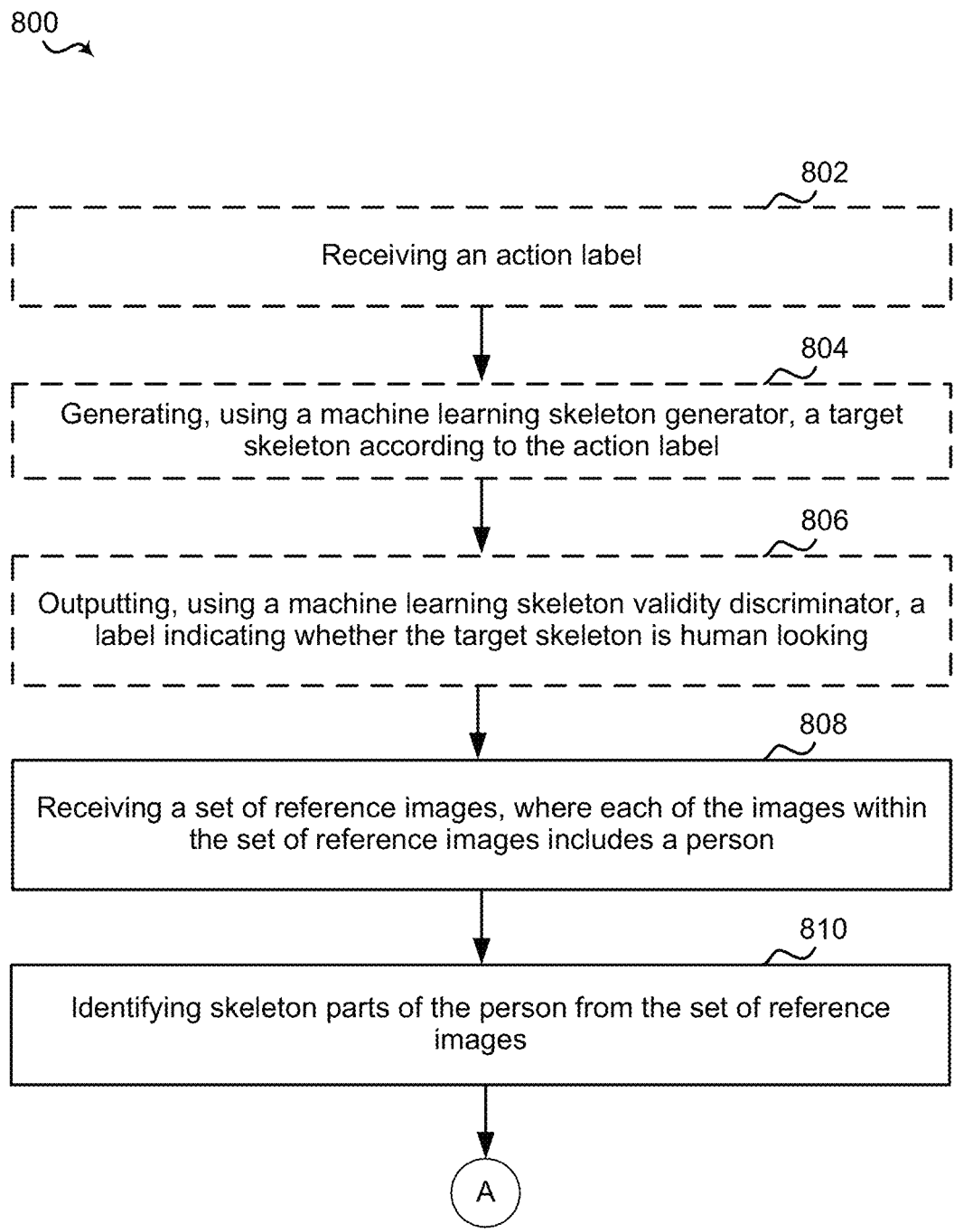
FIGS. 8A-8B is a flowchart of an exemplary method performed by the system of FIG. 1 according to aspects of the present application.
Figure 8B:
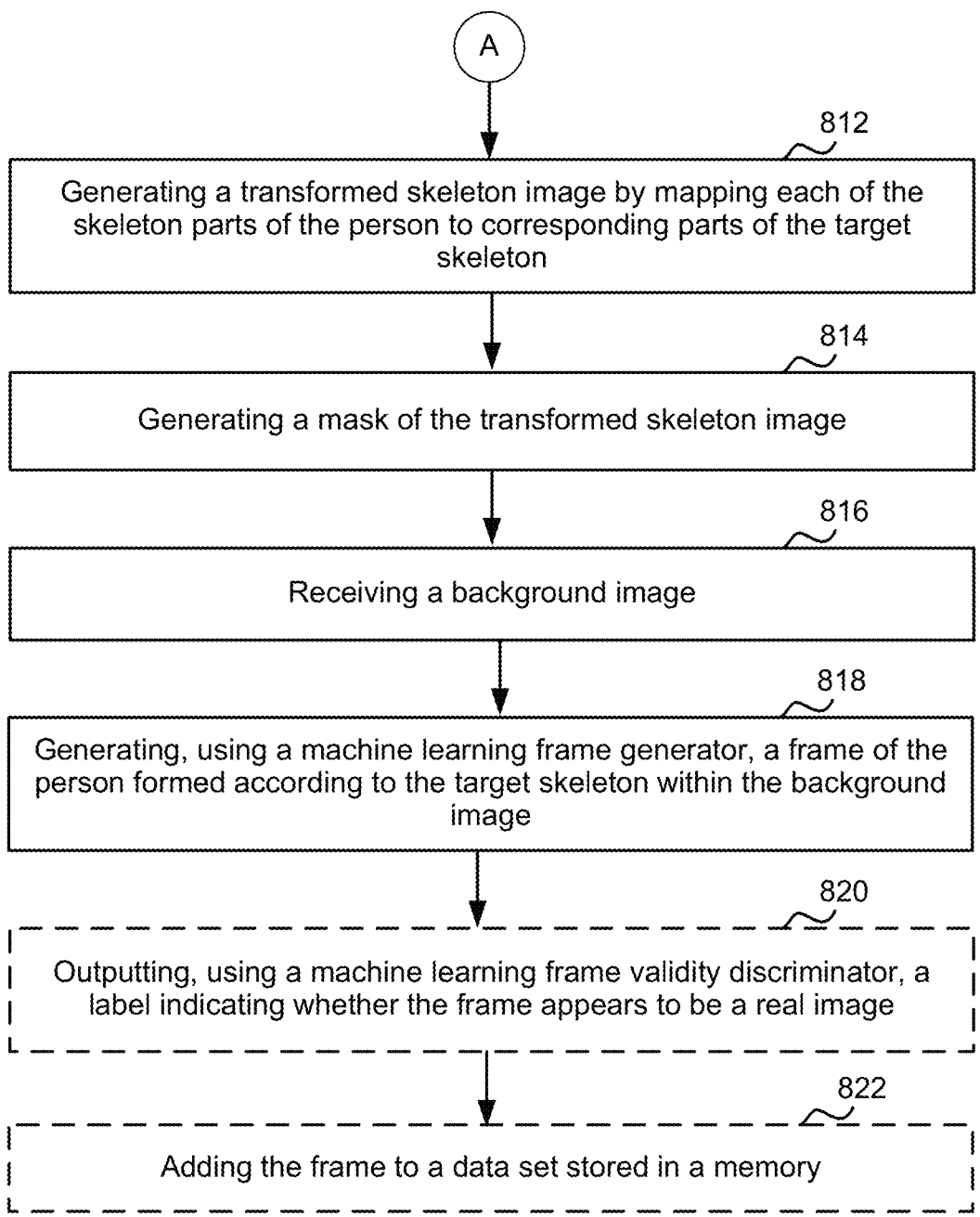

Turning now to FIGS. 8A and 8B, an exemplary method for generating human action data sets is illustrated. The following description of the exemplary method makes reference to the system and components described above. For example, the method 800 may be performed by the system 100, and is accordingly described with reference to FIGS. 1-7, as non-limiting examples of an environment for carrying out the method 800. Additionally, the method 800 may be implemented on a computing device (see e.g., computing device 900 of FIG. 9) operating in the system 100, and subcomponents of the computing device may also be described below.

At block 802, the method 800 may optionally include receiving an action label. For example, as shown by FIG. 1, the skeleton trajectory generator 102 of the system 100 may receive the action label 150. As previously described, the action label may refer to action that a person may perform.

Based on the action label, at block 804, the method 800 may optionally include generating, using a machine learning skeleton generator, a target skeleton according to the action label. For example, once the action label 150 is received, the skeleton generator network 120 of the skeleton trajectory generator 102 may use machine learning to generate a skeleton trajectory 152 (see e.g., FIG. 2A) according to the action label 150. For example, the skeleton generator network 120 may be a conditional GAN. Further, the skeleton generator network 120 may generate a sequence 200 of the skeleton trajectories 152 (see e.g., FIG. 2B), which indicate a range of actions that a person performs while performing the action associated with the action label 150. For example, the skeleton generator network 120 may receive the action label 150 of "sitting" as an input and the output may be the sequence 200 of the skeleton trajectories 152 performing the act of sitting, as shown by FIG. 2A.

At block 806, the method 800 may optionally include outputting, using a machine learning skeleton discriminator, a label indicating whether the target skeleton is human looking. For example, the skeleton trajectory generator 102 may include the skeleton discriminator network 122. In an example, the skeleton discriminator network 122 may use a base having a predetermined convolutional neural network along a time dimension. The skeleton discriminator network 122 may distinguish between human skeletons and non-human skeletons using one or more of a sigmoid layer or a fully-convolutional network. In some examples, the skeleton discriminator network 122 may distinguish between trajectories using a set of convolutions, such as a convolution stride, along the time.

At block 808, the method 800 includes receiving a set of reference images, where each of the images within the set of reference images includes a person. For example, the pre-processor 114 of the frame generator 104 may receive the set of reference images 154 (see e.g., FIG. 3A) from the reference image storage 106. As shown by FIG. 3A, each of the images within the set of reference images 154 includes the same person.

At block 810, the method 800 includes identifying body parts of the person from the set of reference images. For example, the pre-processor 114 of frame generator 104 may determine, identify, and/or extract the body parts of the person 300 of FIG. 4A based on the overlay of the skeleton parts 400 to identify the body parts of the person 300 in each of the reference images 154. In an example, the pre-processor 114 may use human pose estimation or another forms of localizing anatomical parts to identify the body parts of the person 300.

At block 812, the method 800 includes generating a transformed skeleton image by mapping each of the body parts of the person to corresponding skeleton parts of a target skeleton. For example, as shown by the example of FIG. 4A, the pre-processor 114 may map each body part of the person 300 to a corresponding the target skeleton 402 of the skeleton trajectory 152 resulting in transformed skeleton images 410. Each of the images of the set of reference images 154 may be mapped to the target skeleton 402 of the skeleton trajectory 152 to form each of the transformed skeletons 410 (i.e., one to one generation). However, in another example, the two or more images of the set of reference images 154 may be mapped to a single target skeleton of the skeleton trajectories 152 such that a number of transformed skeletons 410 is less than a number of images of the set of reference images 154. In an example, the mapping of the extracted human skeleton may be performed using an offline transform to map the RGB pixel values of each skeleton part 400 from an image of the set of reference images 154 to the skeleton trajectory 152.

At block 814, the method 800 includes generating a mask of the transformed skeleton image. For example, as shown by FIG. 5A, the pre-processor 114 is configured to mask 500 the transformed skeleton 410 at a set of locations, e.g., an area defined by an outline of the transformed skeleton 410, on the corresponding image of the set of reference images 154. In an example, the mask 500 of the transformed skeleton 410 is a mask of a region within the set of reference images 154 where the person 300 was located. In an example, the mask may be a binary mask.

At block 816, the method 800 includes receiving a background image, such as an the background image 156. For example, the frame generator 104 may receive the background image from the background storage 108. The background image 156 may be an arbitrary image having a background different from a background in the images in the set of reference images 154.

At block 818, the method 800 includes generating, using a machine learning frame generator, a frame of the person formed according to the target skeleton within the background image. For example, as shown by FIG. 1, the frame generator 104 may include the frame generator network 140 being trained to generate the frame 158. The frame 158 includes the person 300 performing an action according to the target skeleton 402 while the person 300 is within the arbitrary background 156. Accordingly, the frame 158 is based on the target skeleton 402, the transformed skeleton image 410 and the corresponding mask 500, and the background image 156. The frame generator network 140 generates the frame 158 based on machine learning. An example for the frame generator network 140 may include a GAN that performs machine learning based on equations described herein. The frame may then be stored in the human action data set store 110, which may be accessed by computer vision system 170, or other training system, for performing machine learning-based training of human action recognition model 172.

At block 820, the method 800 may optionally include outputting, using a machine learning frame discriminator, a label indicating whether the frame appears to be a realistic image. For example, as shown by FIG. 1, the frame generator 104 may include the frame discriminator network 144, which is a machine learning network trained to distinguish between real images and fake images. In this example, the frame generator network 140 generates the frame 158 to deceive the frame discriminator network 144 into determining that the frame 158 is a real image.

At block 822, the method 800 may optionally include adding the frame to a data set stored in a memory. For example, as shown by FIG. 1, the frame 158 may be added to the data set storage 110 and included with human action data set 160. In another example, the human action data set 160 may be used to train a human action recognition model 172 of a computer vision system 170, as shown by FIG. 1.

Thus, the described apparatus and methods introduce a novel way to partition an action video clip into action, subject and context. Further, the apparatus and methods can manipulate each part separately and assemble them using the described video generation model into new clips. The actions are represented by a series of skeletons, the context is a still image or a video clip, and the subject is represented by random images of the same person. The apparatus and methods can change an action by extracting it from an arbitrary video clip, and then the new action may be generated by running it through the described skeleton trajectory model, or by applying perspective transform on the existing skeleton. Additionally, the apparatus and methods described herein can change the subject and the context using arbitrary video clips, enabling generation of arbitrary action clips. This is particularly useful for action recognition models which require large data sets to increase their accuracy. With the use of a large unlabeled data and a small set of labeled data, the apparatus and methods of the present disclosure can synthesize a realistic set of training data for machine learning-based training of a human action recognition model, such as for use by a computer vision system.

While examples of apparatuses and methods for generating human data sets have been provided, the present application is not limited to such examples. It will be apparent to those skilled in the art that the above disclosed processes/flowcharts may also be used for the generation of video sequences for arbitrary activities from a single image of a person as may be used in photo applications or special effect generators in devices such as a smartphone or computer.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 9:
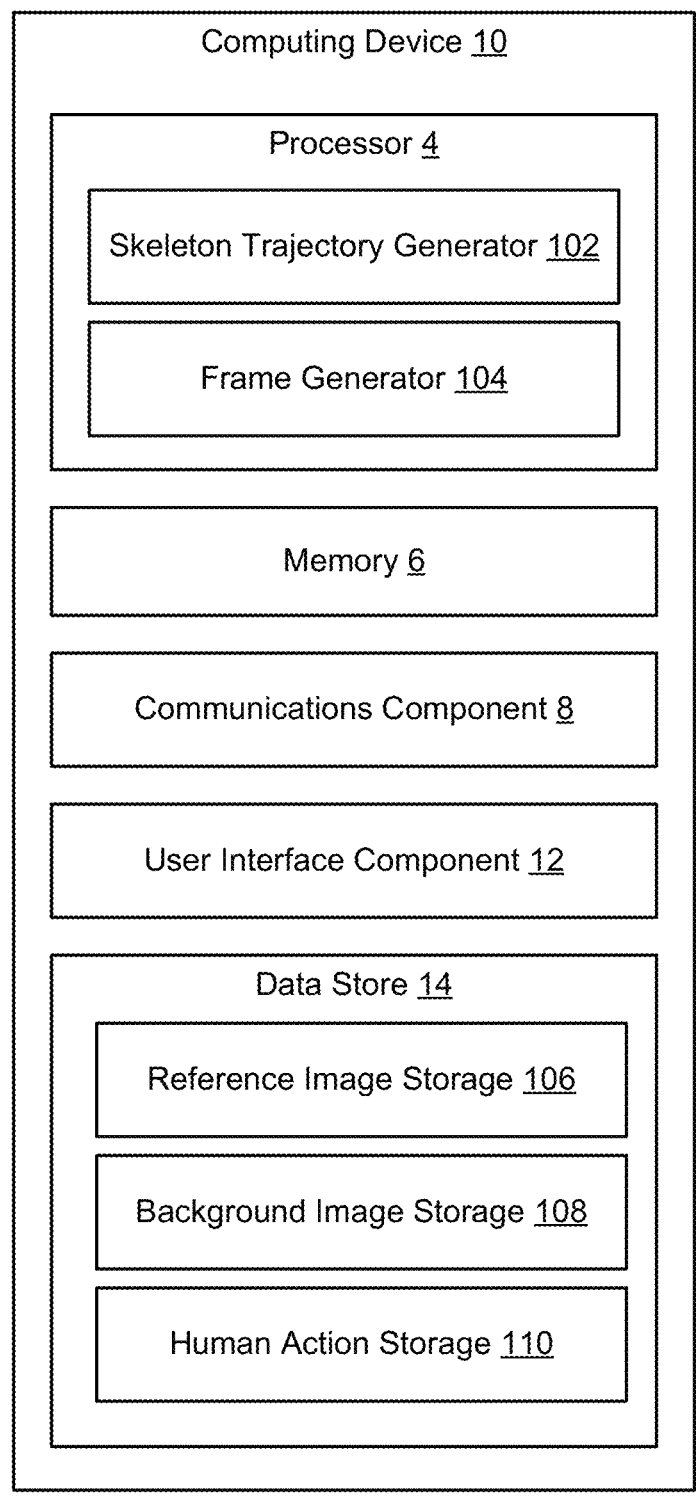
FIG. 9 is a block diagram of an example computer system on which the disclosed system and method can be implemented according to aspects of the present application.

FIG. 9 illustrates an example of computing device 10 including additional optional component details as those shown in FIG. 1. In an example, the computing device 10 may include a processor 4 for carrying out processing functions associated with one or more of components and functions described herein. The processor 4 may include a single or multiple set of processors or multi-core processors. Moreover, the processor 4 may be implemented as an integrated processing system and/or a distributed processing system. In an example, the processor 4 may perform the function of the skeleton trajectory generator 102 and/or the frame generator 104, as described above.

The computing device 10 may further include memory 6, such as for storing local versions of applications being executed by the processor 4, related instructions, parameters, etc. The memory 6 may include a type of memory usable by a computer, such as random access memory (RAM), read only memory (ROM), tapes, magnetic discs, optical discs, volatile memory, non-volatile memory, and any combination thereof. Additionally, the processor 4 and the memory 6 may include and execute an operating system executing on the processor 4, one or more applications, display drivers, etc., as described herein, and/or other components of the computing device 10.

Further, the computing device 10 may include a communications component 8 that provides for establishing and maintaining communications with one or more other devices, parties, entities, etc. utilizing hardware, software, and services as described herein. The communications component 8 may carry communications between components on the computing device 10, as well as between the computing device 10 and external devices, such as devices located across a communications network and/or devices serially or locally connected to the computing device 10. For example, the communications component 8 may include one or more buses, and may further include transmit chain components and receive chain components associated with a wireless or wired transmitter and receiver, respectively, operable for interfacing with external devices.

Additionally, the computing device 10 may include a data store 102, which can be any suitable combination of hardware and/or software, that provides for mass storage of information, databases, and programs employed in connection with examples described herein. For example, a data store 14 may be or may include a data repository for applications and/or related parameters not currently being executed by processor 4. In addition, the data store 14 may be a data repository for an operating system, application, display driver, etc. executing on the processor 4, and/or one or more other components of the computing device 10. In an example, the data store 14 may include the data storages 106-110.

The computing device 10 may also include a user interface component 12 operable to receive inputs from a user of the computing device 10 and further operable to generate outputs for presentation to the user (e.g., via a display interface to a display device). The user interface component 12 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 12 may include one or more output devices, including but not limited to a display interface, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A computer-implemented method for generating human action data sets, comprising:
   receiving a set of reference images, where each image within the set of reference images includes a person;
   identifying body parts of the person in the set of reference images;
   generating a transformed skeleton image by mapping each of the body parts of the person to corresponding skeleton parts of a target skeleton, wherein a body position of the target skeleton is different from a body position of the person in the set of reference images;
   generating a mask of the transformed skeleton image;
   receiving a background image; and
   generating, using a machine learning frame generator, a frame of the person formed according to the target skeleton within the background image, the machine learning frame generator being trained based on the target skeleton, the mask of the transformed skeleton image, and the background image.

2. The computer-implemented method of claim 1, further comprising:
   outputting, using a machine learning frame discriminator, a label indicating whether the frame appears to be a real image, the machine learning frame discriminator being trained to distinguish between real images and fake images received from the machine learning frame generator.

3. The computer-implemented method of claim 1, further comprising:
   receiving an action label; and
   generating, using a machine learning skeleton generator, the target skeleton according to the action label, the machine learning skeleton generator being trained to predict a distribution of skeleton sequences conditioned on the action label.

4. The computer-implemented method of claim 3, further comprising:
   outputting, using a machine learning skeleton discriminator, a label indicating whether the target skeleton is human looking, the machine learning skeleton discriminator being trained to distinguish between real images and fake images received from the machine learning frame generator.

5. The computer-implemented method of claim 1, wherein the target skeleton is one of a plurality of target skeletons indicating sequential motions associated with an action label.

6. The computer-implemented method of claim 1, wherein the mask of the transformed skeleton image is a mask of a region within the set of reference images where the person was located.

7. The computer-implemented method of claim 1, further comprising:
   adding the frame to a data set stored in a memory.

8. A computing device for generating human action data sets, comprising:
   a memory;
   at least one processor coupled to the memory, wherein the at least one processor is configured to:
      receive a set of reference images, where each image within the set of reference images includes a person;
      identify body parts of the person in the set of reference images;
      generate a transformed skeleton image by mapping each of the body parts of the person to corresponding skeleton parts of a target skeleton, wherein a body position of the target skeleton is different from a body position of the person in the set of reference images;
      generate a mask of the transformed skeleton image;
      receive a background image; and generate, using a machine learning frame generator, a frame of the person formed according to the target skeleton within the background image, the machine learning frame generator being trained based on the target skeleton, the mask of the transformed skeleton image, and the background image.

9. The computing device of claim 8, wherein the at least one processor is further configured to:
output, using a machine learning frame discriminator, a label indicating whether the frame appears to be a real image, the machine learning frame discriminator being trained to distinguish between real images and fake images received from the machine learning frame generator.

10. The computing device of claim 8, wherein the at least one processor is further configured to:
receive an action label; and
generate, using a machine learning skeleton generator, the target skeleton according to the action label, the machine learning skeleton generator being trained to predict a distribution of skeleton sequences conditioned on the action label.

11. The computing device of claim 10, wherein the at least one processor is further configured to:
output, using a machine learning skeleton discriminator, a label indicating whether the target skeleton is human looking, the machine learning skeleton discriminator being trained to distinguish between real images and fake images received from the machine learning frame generator.

12. The computing device of claim 8, wherein the target skeleton is one of a plurality of target skeletons indicating sequential motions associated with an action label.

13. The computing device of claim 8, wherein the mask of the transformed skeleton image is a mask of a region within the set of reference images where the person was located.

14. The computing device of claim 8, wherein the at least one processor is further configured to:
add the frame to a data set stored in the memory.

15. A computer-readable storage device storing code executable by one or more processors for generating human action data sets, the code comprising instructions for:
receiving a set of reference images, where each image within the set of reference images includes a person;
identifying body parts of the person in the set of reference images;
generating a transformed skeleton image by mapping each of the body parts of the person to corresponding skeleton parts of a target skeleton, wherein a body position of the target skeleton is different from a body position of the person in the set of reference images;
generating a mask of the transformed skeleton image;
receiving a background image; and
generating, using a machine learning frame generator, a frame of the person formed according to the target skeleton within the background image, the machine learning frame generator being trained based on the target skeleton, the mask of the transformed skeleton image, and the background image.

16. The computer-readable storage device of claim 15, further comprising code for:
outputting, using a machine learning frame discriminator, a label indicating whether the frame appears to be a real image, the machine learning frame discriminator being trained to distinguish between real images and fake images received from the machine learning frame generator.

17. The computer-readable storage device of claim 15, further comprising code for:
receiving an action label; and
generating, using a machine learning skeleton generator, the target skeleton according to the action label, the machine learning skeleton generator being trained to predict a distribution of skeleton sequences conditioned on the action label.

18. The computer-readable storage device of claim 17, further comprising code for:
outputting, using a machine learning skeleton discriminator, a label indicating whether the target skeleton is human looking, the machine learning skeleton discriminator being trained to distinguish between real images and fake images received from the machine learning frame generator.

19. The computer-readable storage device of claim 15, wherein the target skeleton is one of a plurality of target skeletons indicating sequential motions associated with an action label.

20. The computer-readable storage device of claim 15, further comprising code for:
adding the frame to a data set stored in a memory.

* * * * *